3,006,753
METHOD OF MAKING MIXED FERTILIZERS CONTAINING VERMICULITE
Edward William Harvey, Cream Ridge, N.J., assignor to Allied Chemical Corporation, a corporation of New York
No Drawing. Filed Feb. 25, 1958, Ser. No. 717,326
2 Claims. (Cl. 71—29)

This invention relates to a process for the manufacture of mixed fertilizers. More particularly it relates to a process for the manufacture of complete fertilizers high in urea-formaldehyde nitrogen and to the products formed thereby.

Complete fertilizers high in ureaform nitrogen are considered the most important of the types of product that can be prepared by the process of co-pending application, Serial 594,360, filed in the names of Charles E. Waters and Fred L. Kelly, entitled Surface Conditioning of Pulverulent Materials and the Process of Conditioning Them.

In accordance with the process therein described urea-formaldehyde resin is produced in situ from a solution of polymethylol ureas (urea-formaldehyde concentrate) and urea under the influence of acid-reacting materials, the latter either being added deliberately or being present naturally. At some time after the solution of polymethylol urea has been added to the mixture, partial neutralization is effected, usually with the aid of ammonia. It is also quite common, though not obligatory, to have a slowly acting neutralization agent such as dolomite in the mixture. The products obtained in this manner have free flowing characteristics and a granular appearance.

It has however been found that the proportion of urea-formaldehyde concentrate that can be used in the preparation of the mixed fertilizer is seriously limited because an excessive amount causes the fertilizer mixture to become too wet and often too sticky to be handled in ordinary fertilizer manufacturing equipment. Since it is often desirable to make products of this type in equipment used for manufacturing ordinary mixed fertilizer, which is not adapted to handling wet or sticky mixtures, the requirements for physical condition of the material during processing are quite stringent. Work in commercial plants indicates that for treatment of superphosphate fertilizer in the ordinary fertilizer manufacturing equipment, the practical limit is approximately 100 pounds of urea-formaldehyde concentrate per tone of product. According to usual practice from about 150 to about 200 pounds of urea would be used with 100 pounds of urea-formaldehyde concentrate. This practice provides at most about 4% of urea-formaldehyde resin nitrogen in the final product.

It has now been found that a mixed fertilizer containing relatively large amounts of urea-formaldehyde resin can readily be prepared in conventional fertilizer plant equipment by mixing expanded vermiculite with the conventional acidic fertilizer ingredients such as superphosphate or triple superphosphate and mixing the urea and solution of polymethylol urea therewith. After this solution has had an opportunity to be intimately mixed with the fertilizer ingredients under the acid conditions existing, the mixture is then further treated with an ammoniating solution which may contain ammonium salts such as ammonium nitrate. The solid urea may be included with the solid ingredients or it may be premixed with polymethylol urea solution.

By operating in accordance with the invention as much as about 15–30% of urea-formaldehyde resin, corresponding to 300–600 pounds per ton of product, may be incorporated without difficulty in the usual equipment.

Although vermiculite is nitrogen free, it is inorganic and non-combustible and in expanded form is highly effective in increasing the amount of polymethylol urea solution that can be used for the production of a complete fertilizer by the method described by Waters et al. An amount of expanded vermiculite about 3–10% of the final fertilizer product has been found effective for the purposes of the invention.

Although other sources of formaldehyde may be used it has been found most practicable to use a liquid polymethylol urea concentrate as a source of the formaldehyde ingredient and as a source for part of the urea. The liquid concentrate which has been found to be particularly suitable for this purpose, referred to hereinafter as UF solution, is an aqueous solution containing about 60% formaldehyde and 25% urea, which solution is prepared in accordance with the disclosure of U.S. Patent 2,652,377. This product reacts with added urea to form mixtures of compounds of different degrees of solubility in water, which are often collectively referred to as "ureaform." UF solutions are available commercially under the trademarks "UF Concentrate 85" and "N–dure."

The UF solution and urea may furnish a substantial part, and in some cases nearly all, of the nitrogen in the products. Other sources of nitrogen which may be added are ammonium salts, for example ammonium sulfate; nitrates and ammoniating media, including anhydrous or aqua ammonia, as well as solutions containing ammonia and ammonium nitrate or urea, or both; and nitrogen-bearing natural organics, such as cottonseed meal.

The principal phosphatic material is usually superphosphate. Depending upon the formulation, normal or triple superphosphate, or a mixture of both may be used. Either type is sufficiently acidic to promote the reaction between UF solution and urea. Phosphoric acid and ammonium phosphates are other sources of $P_2O_5$. Ammoniated superphosphate as the primary ingredient may constitute about 25–60% of the final products of the invention.

Potassium may be supplied in any of the usual forms, for example the chloride (muriate), the sulfate and a double sulfate of potassium and magnesium.

Other solid ingredients which may be present are dolomite, which is a slowly-acting neutralizing agent, and inert fillers such as clay or sand. Dolomite also serves as a source of water-insoluble magnesium, which gradually becomes available to plants.

Although superphosphate is sufficiently acidic to promote reaction between UF solution and urea, extra acid, for example sulfuric or phosphoric acid, may be used. The excess acid permits the use of a greater proportion of ammoniating solution, which is an especially cheap form of nitrogen and which provides additional heat of ammoniation, the heat serving to promote the formation of ureaform and also in some cases to aid in drying the product.

Although the process is adaptable for use with a continuous mixer and ammoniator, the procedure will be described here in terms of a batch operation. The solid ingredients for one batch, which may or may not be premixed, are placed in the mixer. In a typical case these will include the superphosphate, the potassium salt, some ammonium sulfate, some dolomite, and expanded vermiculite. Once the solids are added and the mixer is operating, the UF solution is added through a spray pipe or other device that distributes it relatively evenly throughout the mass. Mixing is continued, and after an interval, such as forty-five seconds to five minutes, the ammoniating medium is added.

It is important that the urea-formaldehyde concentrate and the ammoniating solution are added in sequence to the solid fertilizer mix. This type of operation increases the proportion of water insoluble nitrogen in the product. The ureaform formation proceeds very efficiently in an acid reaction mixture, but quite slowly when the acidic phosphate has been largely neutralized with ammonia. After some further mixing, the batch is discharged. Depending upon the equipment available, the material may be conveyed directly to the storage pile, or it may be passed through a dryer, or a dryer and cooler, before going to the pile. To permit the reactions to proceed to the desired extent, it is desirable that the temperature of the material entering the storage pile be in the range of 100° to 140° F., and that it remain in the pile for several days.

Proper operation and discharge of the mixer, and proper operation of conveying apparatus, e.g., conveyor belts and elevators, as well as dryers and coolers, are dependent upon having the material in a free-flowing condition. It may be somewhat moist in appearance and feel, but it must not stick in any of the equipment. The product containing expanded vermiculite remains in the necessary free-flowing condition, although it may contain substantially more than 100 pounds of UF solution per ton of fertilizer.

The relative amounts of UF solution and urea are important. To avoid excessive insolubility it is desirable to have at least about 1.3 mols of urea (including the urea contained in the UF solution) per mol of formaldehyde. (The fact that the urea and formaldehyde in the UF solution are already combined, in part, is ignored in the calculations.) No more than 2 mols of urea can be combined with one mol of formaldehyde, and it is usually desirable to avoid exceeding that ratio. Thus, it is desirable to have from 1.3 to 2.0 mols of urea per mol of formaldehyde. Assuming that the UF solution contains 60% by weight of formaldehyde and 25% urea, and that the solid urea is of a fertilizer grade equivalent to about 96% pure urea, this means that about 135 to 225 pounds, preferably about 150 to 200 pounds of urea should be used per 100 pounds of UF solution. If the ammoniating solution provides some urea, the amount supplied in solid form should be reduced accordingly.

Although expanded vermiculite promotes the necessary free-flowing conditions, it may interfere to some degree with the reaction between UF solution and urea, perhaps by absorbing part of the solution. Premixing of UF solution and solid urea shortly before making the fertilizer helps to overcome this difficulty. Premixing should be done in a separate mixer, which should be equipped with an efficient agitator and heating means. Since localized overheating would be likely to cause premature reaction, heating with hot water in a jacket or coil is especially desirable.

EXAMPLES

Example 1

A 9–7–4 fertilizer was made, starting with a solid mixture comprising 716 parts by weight of normal superphosphate, 239 parts of uncoated pelleted urea, 140 parts of fertilizer grade potassium chloride (approximately 60% $K_2O$ equivalent), 200 parts of pulverized dolomite, 194.5 parts of sand, and 200 parts of expanded vermiculite. The mixture was preheated in an oven at 60° C., then placed in the ammoniator, which had been preheated to 60° C. 192 parts of UF solution ("UF Concentrate 85") was immediately sprayed into the mixed solids in a period of 23 seconds. The temperature of the mass of solids was 51° C. just before addition of the UF solution and 49° C. just afterwards. After a brief interval the mixture was ammoniated with 143.5 parts of a solution comprising 30.6% ammonia, 43.1% urea, and 26.3% water, the temperature rising to 62° C. The mixture was somewhat moist but manageable. After being kept at 50° C. for ten days, the product analyzed 9.6% total nitrogen, including 3.9% water-insoluble nitrogen. The activity index of the water-insoluble nitrogen was 49, according to a procedure of the Association of Official Agricultural Chemists.

Example 2

A 10–5–5 fertilizer was made, starting with a preheated mixture of solids, comprising 540 parts of normal superphosphate, 300 parts of uncoated pelleted urea, 170 parts of fertilizer grade potassium chloride, 600 parts of dolomite, and 100 parts of expanded vermiculite. "UF Concentrate 85," 210 parts, was added over a period of eighteen seconds. After a short interval, the mixture was ammoniated with 100 parts of a solution containing 33% ammonia, 45.1% ammonium nitrate, 13% urea, and 8.9% water. The product was in good physical condition, and was somewhat granular. The product analyzed approximately 10.6% total nitrogen, and after being kept at 50° C. for three days it showed 3.0% water-insoluble nitrogen. The activity index of the water-insoluble nitrogen was 52.

Example 3

Another 10–5–5 fertilizer was made with the same amounts of the ingredients as in Example 2, but mixed in different equipment and in different order. The superphosphate, potassium chloride, vermiculite, and half of the dolomite were mixed in a vessel equipped with a closely fitting agitator-scraper blade. The urea and "UF Concentrate 85" were premixed in a separate vessel, and heated to 50° C.; a major part of the urea dissolved, the remainder stayed in the mixture as a solid. This slurry was added to the mixture of solids and mixed well. After a short interval, the ammoniating solution was added, and finally the remaining half of the pulverized dolomite was stirred in.

While the above description discloses preferred and practical embodiments for making the mixed fertilizers of this invention, it will be understood that the specific details set forth herein are by way of illustration and are not to be construed as limiting the scope of the invention.

I claim:

1. The method of preparing a mixed fertilizer which comprises mechanically mixing acidic phosphate fertilizer ingredients with expanded vermiculite, premixing urea and a polymethylol urea concentrate, preheating said mix to about 50° C., incorporating the resulting slurry into the mechanically mixed acidic fertilizer ingredients to form ureaform in situ and ammoniating the resulting mixture to partially neutralize the mixture and obtain a mixed fertilizer product with the ureaform uniformly distributed in the vermiculite, said urea and polymethylol urea concentrate being added in such proportions that the total mol ratio of urea to formaldehyde in the resultant mixture lies within the range of 1.3–2.

2. The method of preparing a mixed fertilizer which comprises mechanically mixing acidic phosphate fertilizer ingredients including an alkaline earth carbonate with expanded vermiculite, premixing urea and polymethylol urea concentrate, preheating said mix to about 50° C., incorporating the resulting slurry into the mechanically mixed acidic fertilizer ingredients to form ureaform in situ, treating the resulting mixture with an ammonating solution to partially neutralize the mixture and obtain a mixed fertilizer product with the ureaform uniformly distributed in the vermiculite, said urea and polymethylol urea concentrate being added in such proportions that the total mol ratio of urea to formaldehyde in the resultant mixture lies within the range of 1.3–2, and adding an additional quantity of an alkaline earth carbonate.

(References on following page)

References Cited in the file of this patent

UNITED STATES PATENTS

| | | |
|---|---|---|
| 2,255,026 | Keenen et al. | Sept. 2, 1941 |
| 2,618,546 | Davenport | Nov. 18, 1952 |
| 2,669,510 | Dresser | Feb. 16, 1954 |
| 2,766,283 | Darden | Oct. 9, 1956 |
| 2,791,496 | Rice | May 7, 1957 |

OTHER REFERENCES

Commercial Fertilizer, Jacob, U.S.D.A. Fertilizer Technology Research since 1950, March 1954, pages 29–40.